US012798382B2

(12) United States Patent
Matsuyama

(10) Patent No.: US 12,798,382 B2
(45) Date of Patent: Nov. 17, 2026

(54) RESIN MOLDED PRODUCT AND IN-VEHICLE INFORMATION DEVICE

(71) Applicant: DENSO TEN Limited, Kobe (JP)

(72) Inventor: Nozomu Matsuyama, Kobe (JP)

(73) Assignee: DENSO TEN Limited, Kobe (JP)

( * ) Notice: Subject to any disclaimer, the term of this patent is extended or adjusted under 35 U.S.C. 154(b) by 345 days.

(21) Appl. No.: 18/615,018

(22) Filed: Mar. 25, 2024

(65) Prior Publication Data

US 2025/0065720 A1 Feb. 27, 2025

(30) Foreign Application Priority Data

Aug. 24, 2023 (JP) ................................ 2023-136338

(51) Int. Cl.
*B60K 35/50* (2024.01)
*B60K 35/22* (2024.01)

(52) U.S. Cl.
CPC ............. *B60K 35/50* (2024.01); *B60K 35/22* (2024.01)

(58) Field of Classification Search
CPC ........ B60K 35/50; B60K 35/22; B60K 35/60; B60K 2360/84
See application file for complete search history.

(56) References Cited

U.S. PATENT DOCUMENTS

2011/0141590 A1* 6/2011 Iseki ...................... B60R 1/074 29/592.1

FOREIGN PATENT DOCUMENTS

JP 2011-189544 A 9/2011

* cited by examiner

*Primary Examiner* — Alazar Tilahun
(74) *Attorney, Agent, or Firm* — Oliff PLC

(57) ABSTRACT

A resin molded product includes: a first surface; and a first positioning pin extending from the first surface in a first direction. The first positioning pin includes chamfered portions chamfered at two positions facing each other on an outer peripheral surface of the first positioning pin when viewed from the first direction, and a parting line is formed in the chamfered portions.

20 Claims, 10 Drawing Sheets

RESIN MOLDED PRODUCT AND IN-VEHICLE INFORMATION DEVICE

CROSS-REFERENCE TO RELATED APPLICATIONS

This application is based on and claims priority under 35 USC 119 from Japanese Patent Application No. 2023-136338 filed on Aug. 24, 2023, the entire content of which is incorporated herein by reference.

TECHNICAL FIELD

The present disclosure relates to a resin molded product and an in-vehicle information device.

BACKGROUND ART

When a plurality of components are assembled by fitting, a configuration may be adopted in which one component is provided with a positioning pin, and, for fitting the positioning pin into a fitting hole provided on another component, an outer peripheral surface of the positioning pin abuts against an inner wall of the fitting hole, so that positional accuracy of the fitting is improved. JP2011-189544A describes injection molding of a positioning boss protruding in a vertical direction with respect to a flat plate-shaped portion.

SUMMARY

In JP2011-189544A, since a removal direction of a core and an axial direction of the positioning boss (pin) are the same, molding may be simply performed using a cavity and the core. However, if the axial direction of the positioning pin is inclined with respect to the removal direction of the core, an undercut occurs, and a mold with which molding is performed using just the cavity and the core cannot be obtained. For this reason, an undercut process is further performed using a slide core, but in this case, a parting line is generated on an outer peripheral surface of the positioning pin at a position corresponding to a joint between the core and the slide core. Therefore, the parting line (burr) protrudes from the outer peripheral surface of the positioning pin, resulting in a problem that the positional accuracy of fitting may be lowered.

Aspects of of the present disclosure relate to providing a technique in which in a resin molded product formed with an undercut at the time of injection molding, a chamfered portion is provided on an outer peripheral surface and a parting line is provided on the chamfered portion, so that when the resin molded product is fitted with another fitting member with the outer peripheral surface coming into contact with the other fitting member, the parting line is prevented from coming into contact with the other fitting member, and a decrease in the positional accuracy of fitting is prevented.

According to an aspect of the present disclosure, there is provided a resin molded product including: a first surface; and a first positioning pin extending from the first surface in a first direction, in which the first positioning pin includes chamfered portions chamfered at two positions facing each other on an outer peripheral surface of the first positioning pin when viewed from the first direction, and a parting line is formed in the chamfered portions.

According to the present disclosure, it is possible to provide a technique for preventing a decrease in the positional accuracy of fitting.

BRIEF DESCRIPTION OF DRAWINGS

Exemplary embodiment(s) of the present invention will be described in detail based on the following figures, wherein.

DESCRIPTION OF EMBODIMENTS

Hereinafter, embodiments of the present disclosure will be described with reference to the drawings. The configurations of the following embodiments are examples, and the present disclosure is not limited to the configurations of the embodiments.

First Embodiment

Figure 1A:
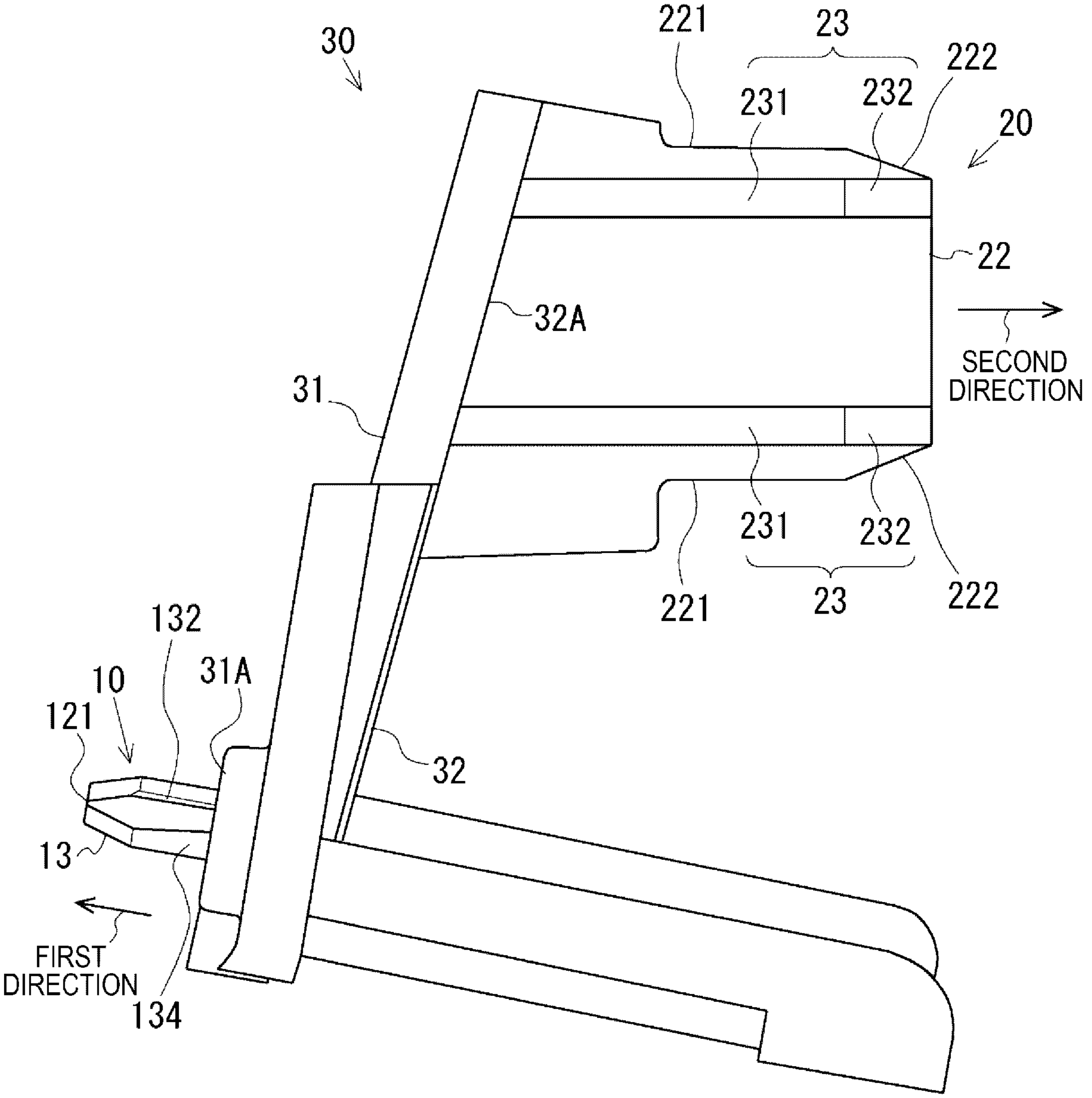
FIG. 1A is a view showing an example of a bracket including a positioning pin according to a first embodiment.
Figure 1B:
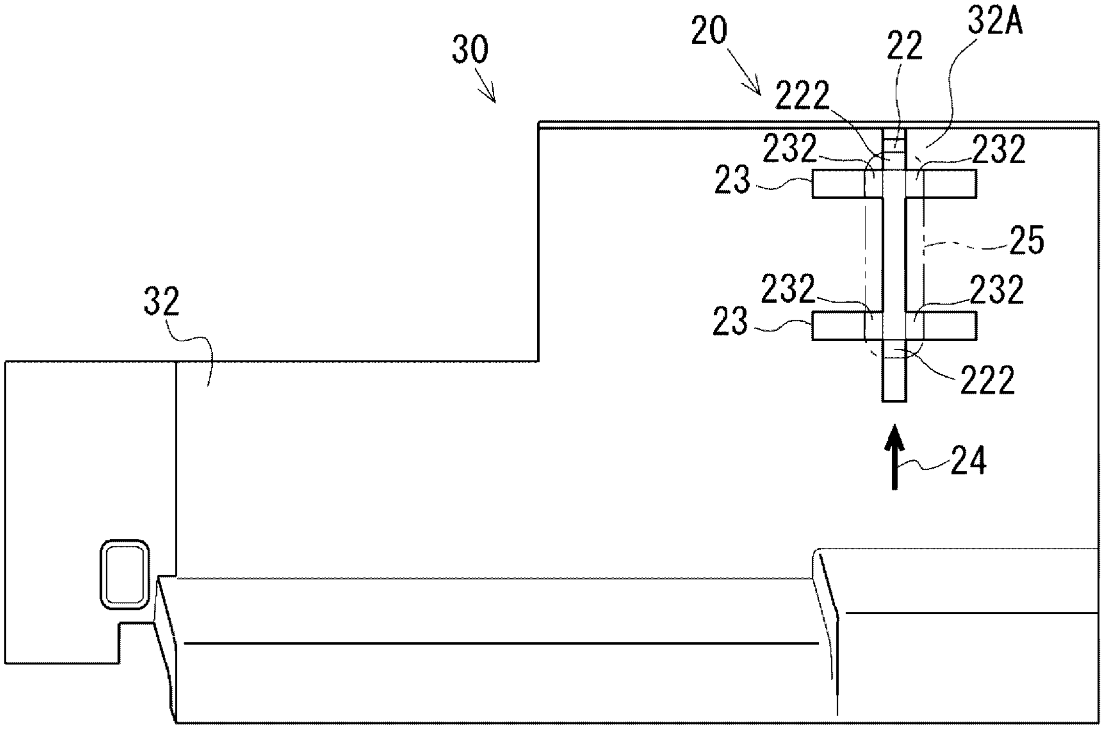
FIG. 1B is a rear view of the bracket.
Figure 1C:
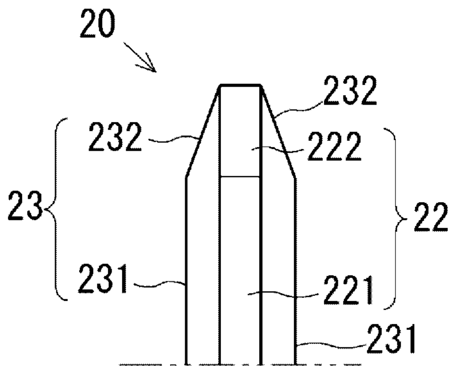
FIG. 1C is a view of a tip end of a second positioning pin shown in FIG. 1B as viewed from a direction of an arrow 24.
Figure 2:
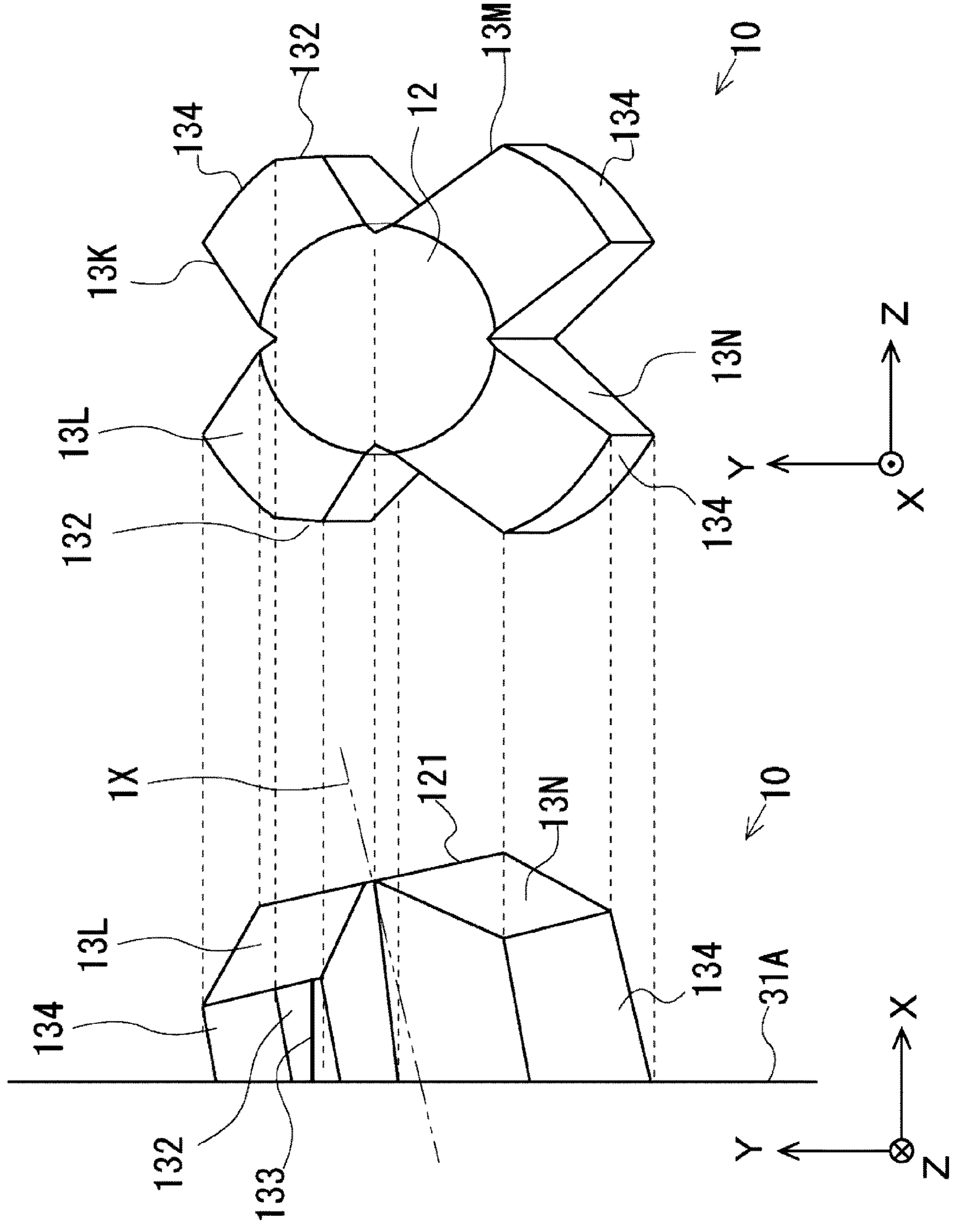
FIG. 2 is a diagram showing a correspondence relationship between locations of the positioning pin viewed from the front and locations viewed from the side.
Figure 3:
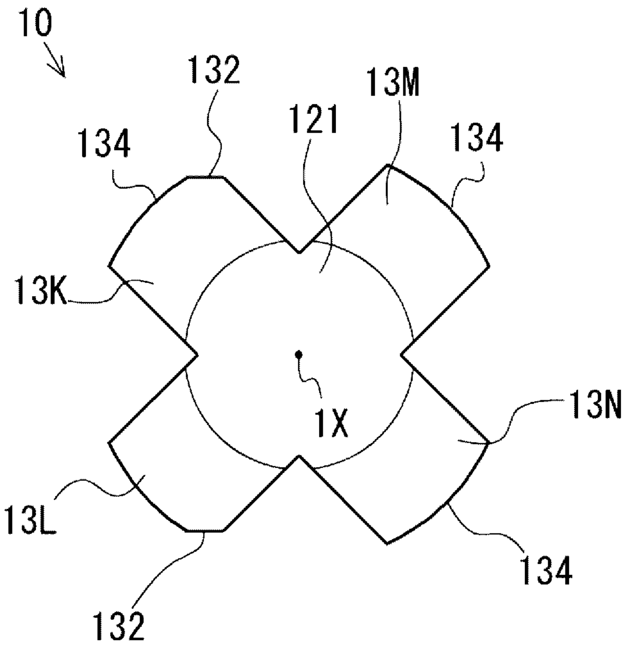
FIG. 3 is a view showing a top surface and a tapered surface when the positioning pin is viewed from an axial direction.
Figure 4:
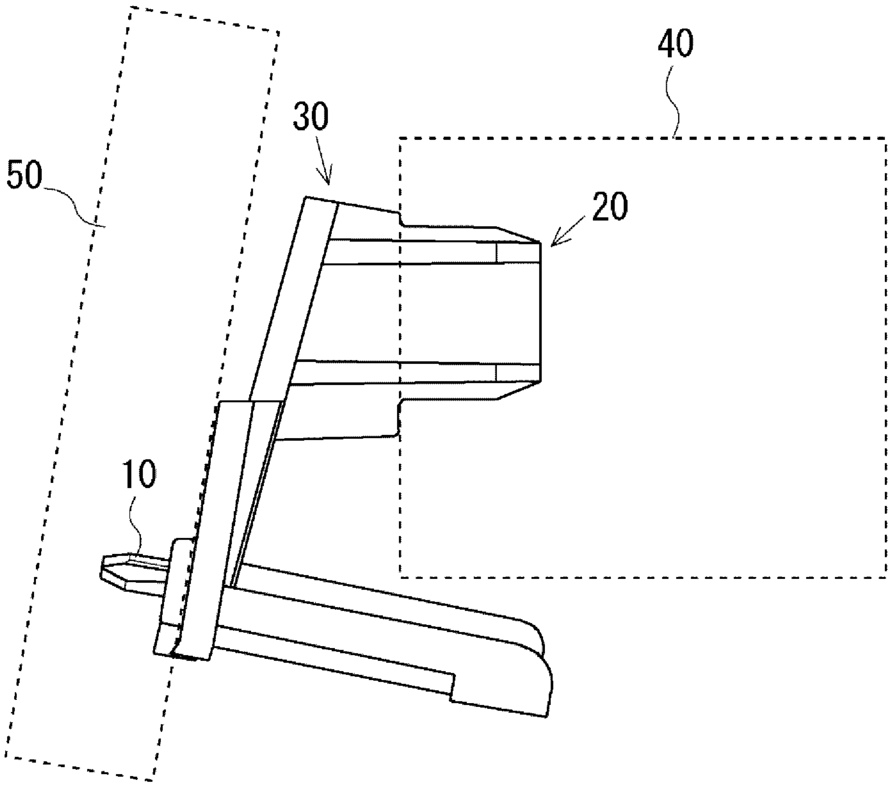
FIG. 4 is a diagram showing a positional relationship between a display unit and a main body portion to which the bracket is to be attached.

FIG. 1A is a view showing an example of a bracket 30 including a positioning pin according to the first embodiment. FIG. 1B is a rear view of the bracket 30. FIG. 1C is a view showing a tip end of a second positioning pin as viewed from a direction of an arrow 24 shown in FIG. 1B. FIG. 2 is a diagram showing a correspondence relationship between locations of the positioning pin viewed from the front and locations viewed from the side. FIG. 3 is a view showing a top surface and a tapered surface when the positioning pin is viewed from an axial direction. FIG. 4 is a diagram showing a positional relationship between a display unit and a main body portion to which the bracket is to be attached.

The bracket 30 is a resin molded product molded by injecting a heated and melted plastic resin into a mold. The bracket 30 has a function of coupling a display unit 50 to a main body portion 40 by having one side attached to the main body portion and having the other side attached to the display unit 50. The bracket 30 is not limited to the shape shown in FIG. 1, and may be designed as appropriate according to the main body portion 40 and the display unit 50 to be attached.

The bracket 30 according to the present embodiment includes a first positioning pin 10 on a first surface (first main surface) 31 on a side close to the display unit 50. The first positioning pin 10 is provided so as to extend in one direction toward the display unit 50 from a part of the first surface (predetermined surface) 31A provided at a predetermined position. The first positioning pin 10 is formed in a cross shape when viewed from a first direction (extending direction). In other words, the first positioning pin 10 is shaped like a cylinder along the first direction with V-shaped notches extending toward a central axis 1X from four locations spaced apart at equal intervals around an axis on an outer peripheral surface thereof. Hereinafter, a central portion is also referred to as a shaft portion 12, and a portion extending in the cross direction is also referred to as a reinforcing rib 13.

The reinforcing ribs 13 are provided in a cross shape in a radial direction of the cylinder from the central axis 1X when viewed from the first direction, and have an arcuate outer periphery. Further, a tip end side of the reinforcing rib 13 is formed in a tapered shape, and the center of the tip end side of the tapered surface, that is, a tip end surface 121 of the shaft portion 12 is formed in a substantially circular shape. Further, the first positioning pin 10 of the present embodiment includes chamfered portions 132 at two locations facing to each other on the outer peripheral surface of the reinforcing rib 13, and a parting line 133 is formed in the chamfered portions 132 when the first positioning pin 10 is injection molded as described later. Here, "facing to each other" includes not only a state where surfaces of the two chamfered portions 132 face each other in parallel, but also a state where the surfaces are slightly deviated from the parallel state (for example, within plus or minus 10 degrees).

The first positioning pin 10 is provided so as to extend in a direction different from a direction orthogonal to the first surface 31 of the bracket 30. Here, the first surface 31 is a surface orthogonal to a removal direction of the core at the time of injection molding. Therefore, the first positioning pin 10 is provided in a direction different from the removal direction of the core as described later. Hereinafter, the state of the first positioning pin 10 is also referred to as "inclined with respect to the first surface 31", "inclined with respect to the removal direction of the core" and the like.

When attaching the display unit 50 to the bracket 30, the first positioning pin 10 is fitted into a fitting hole (positioning hole) of the display unit 50, and an outer peripheral surface 134 of the reinforcing rib 13 comes into contact with an inner peripheral surface of the fitting hole, thereby positioning the display unit 50 at a predetermined position with respect to the bracket 30. Here, the first positioning pin 10 is inserted into the fitting hole so as to be orthogonal to a surface (attachment surface) of the display unit 50 where the fitting hole is provided. Therefore, for example, when attaching the display unit 50 to the bracket 30 in a state where the attachment surface of the display unit 50 is not parallel to the first surface 31 of the bracket 30, the first positioning pin 10 is designed to be inclined with respect to the first surface 31 of the bracket 30.

The bracket 30 includes a second positioning pin 20 on a second surface (second main surface) 32 on a side close to the main body portion 40. The second positioning pin 20 is provided so as to extend in a second direction toward the main body portion from a part of the second surface (predetermined surface) 32A provided at a predetermined position. The second positioning pin 20 includes a base body 22 having a flat plate shape and provided along the second direction, and two reinforcing ribs 23 provided so as to be orthogonal to the base body 22. In other words, two cross-shaped pins, such as the first positioning pin 10, are arranged in parallel, and the reinforcing ribs are connected to each other to form a continuous flat base. When the base body 22 and the reinforcing ribs 23 are viewed in the second direction, side surfaces 221 and 231 facing each other across the intersection of the base body 22 and the reinforcing ribs 23 stand upright in the second direction from the predetermined surface 32A. Tip end sides of the side surfaces 221 and 231 are inclined surfaces 222 and 232 that are inclined toward the intersection of the base body 22 and the reinforcing ribs 23. In FIG. 1A, a direction in which the second positioning pin 20 extends (second direction) is parallel to a removal direction of the cavity, so that the cavity can be removed without using a slide core, and unlike the first positioning pin 10, a chamfered portion is not provided. The present disclosure is not limited to this. In a case where the direction in which the second positioning pin 20 extends (second direction) is different from the removal direction, the chamfered portion may be provided similarly to the first positioning pin 10.

When attaching the bracket 30 to the main body portion 40, the second positioning pin 20 is inserted into a long hole (positioning hole) of the main body portion 40 as indicated by a two-dot chain line 25 in FIG. 1B, and the side surfaces 221 and 231 of the base body 22 and the reinforcing ribs 23 of the second positioning pin 20 come into contact with an inner peripheral surface of the positioning hole, thereby positioning the bracket 30 at a predetermined position with respect to the main body portion 40. That is, the display unit 50 is positioned at a predetermined position with respect to the bracket 30, and the bracket 30 is positioned at a predetermined position with respect to the main body portion 40 as described above, so that the display unit 50 is positioned with respect to the main body portion 40.

The first positioning pin 10 and the second positioning pin 20 are provided in opposite directions, and the first positioning pin 10 is provided to be inclined with respect to the direction in which the second positioning pin 20 extends (second direction).

(Manufacturing Method)

Next, a manufacturing method of the bracket 30 will be described. The bracket 30 according to the present embodiment is manufactured by injection molding. The bracket 30 is formed by using a mold including at least a cavity 61 and a core 62, injecting a heated and melted plastic resin into the mold, and molding the plastic resin into the shape of the mold.

Figure 5:
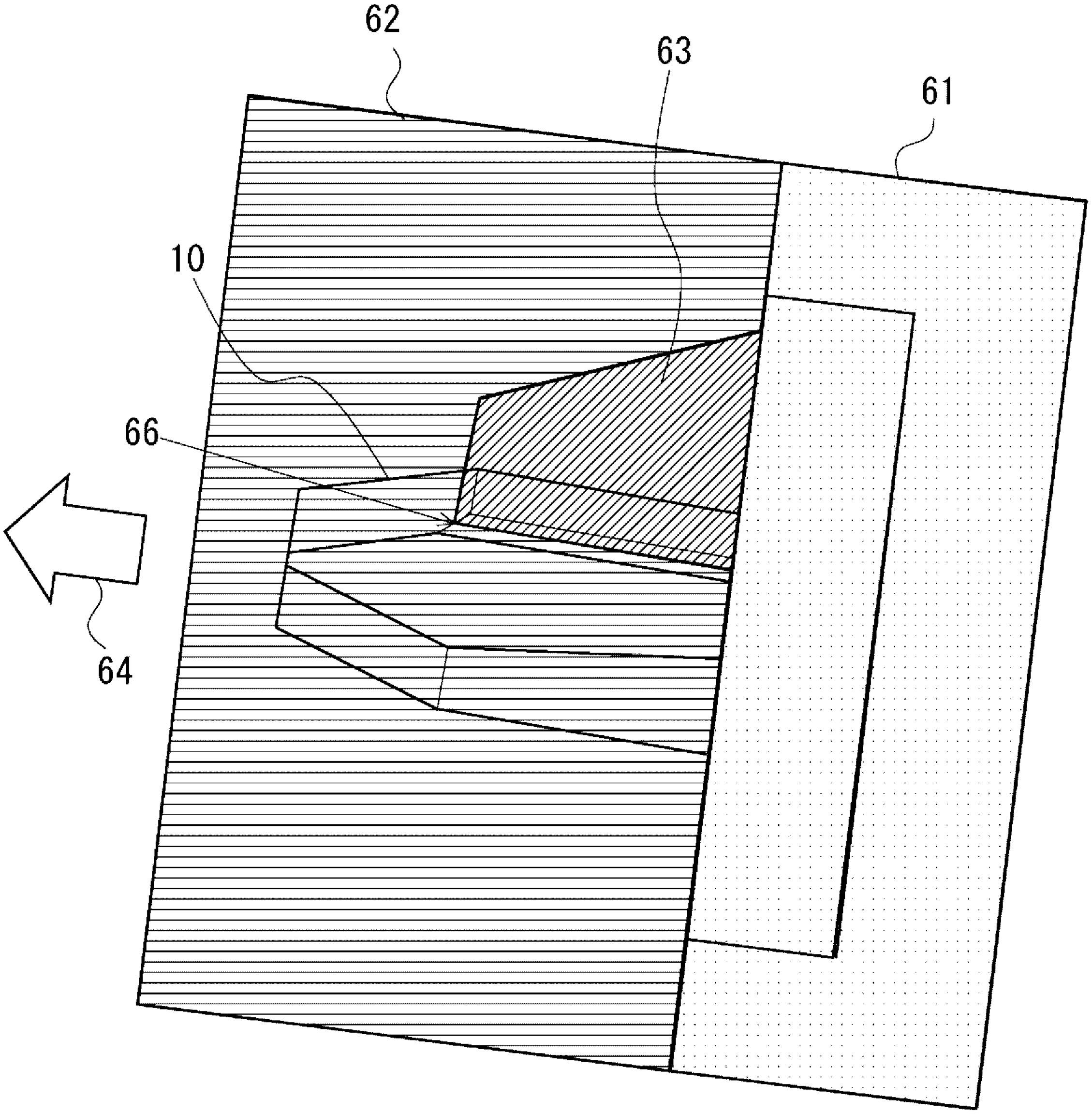
FIG. 5 is a diagram schematically showing a configuration of a mold for injection molding a first positioning pin of the bracket.
Figure 6:
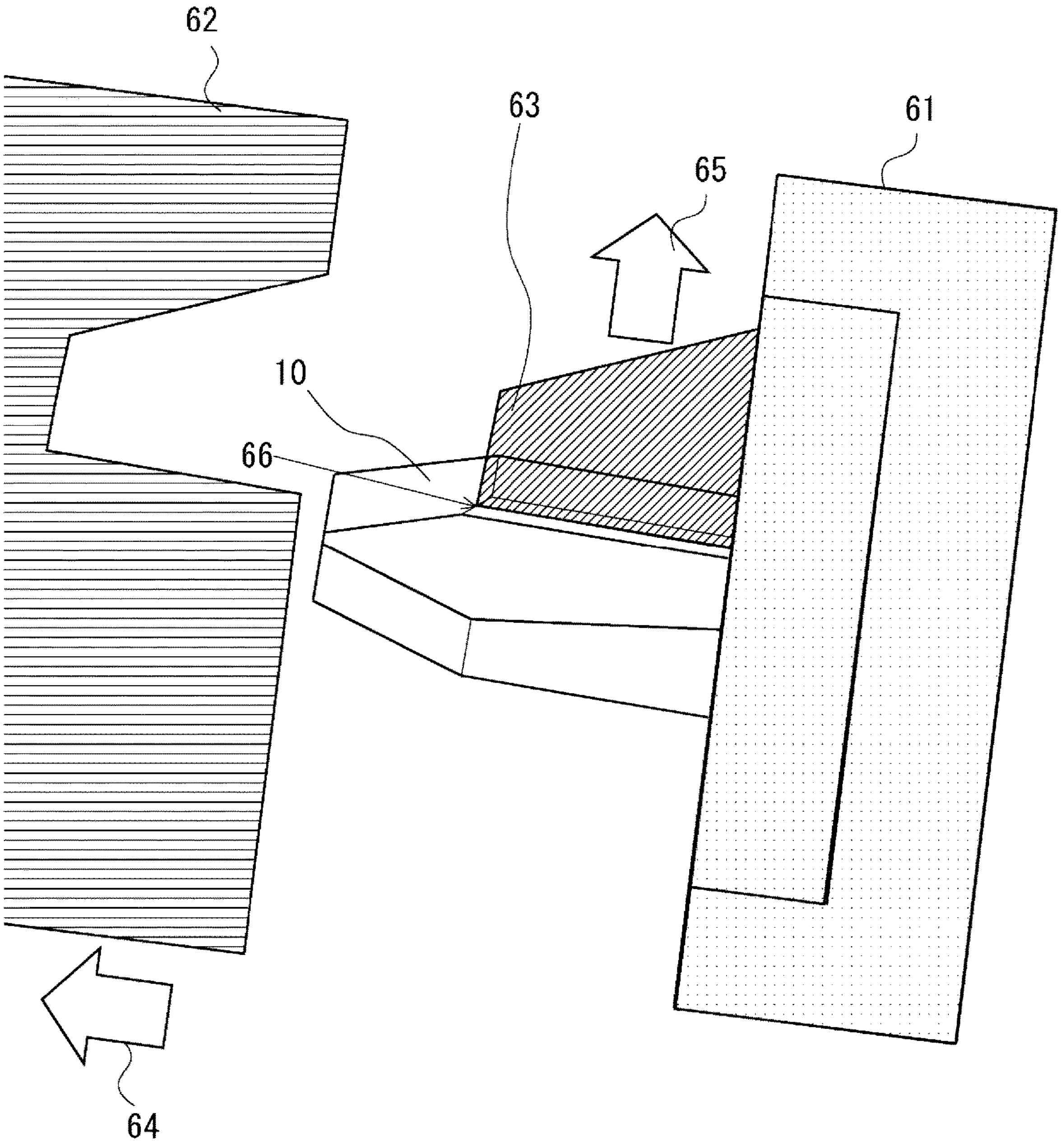
FIG. 6 is a view showing a removal direction of a slide core in the mold of FIG. 5.

FIG. 5 is a diagram schematically showing a configuration of a mold for injection molding the first positioning pin 10 of the bracket 30. FIG. 6 is a view showing a removal direction of a slide core 63 in the mold of FIG. 5. As described above, the bracket 30 according to the present embodiment is formed such that the first positioning pin 10 is inclined with respect to the first surface 31. For example, when the removal direction of the core is an X-axis direction (horizontal direction) in FIG. 2, the central axis 1X of the first positioning pin 10 is inclined upward (Y-axis direction). That is, an angle formed by the predetermined surface 31A and the central axis 1X is an acute angle above the central axis 1X, and an obtuse angle below the central axis 1X. In the example of FIG. 2, the central axis 1X is inclined toward reinforcing ribs 13K and 13L among four reinforcing ribs 13K, 13L, 13M, and 13N. Therefore, an angle formed between the predetermined surface 31A and outer peripheral surfaces and side walls of the reinforcing ribs 13K and 13L is also an acute angle, and this part is an undercut. Therefore, the mold for molding the bracket 30 includes the slide core 63 in addition to the cavity 61 and the core 62 as shown in FIG. 5.

In FIG. 5, the core 62 is moved in a direction orthogonal to the first surface 31 as indicated by an arrow 64 when the mold is opened. The slide core 63 is moved in a direction in which the central axis 1X is inclined, as shown by an arrow 65, and in a direction orthogonal to the removal direction of the core 62. This allows the bracket 30 to be injection molded even when the first positioning pin 10 causes an undercut.

At this time, a parting line 133 is formed on an outer surface of the first positioning pin 10 at a position corresponding to a joint between the core 62 and the slide core 63. In the present embodiment, the mold is configured such that the parting line 133 is formed not on the outer peripheral surface 134 to come into contact with the inner wall of the fitting hole, but on the chamfered portions 132 chamfered at two positions facing each other on the outer peripheral surface 134, and the joint 66 between the core 62 and the slide core 63 is formed at the position of the chamfered portions 132. Therefore, in the bracket 30 according to the present embodiment, the parting line 133 is formed on the chamfered portions 132.

Figure 7:
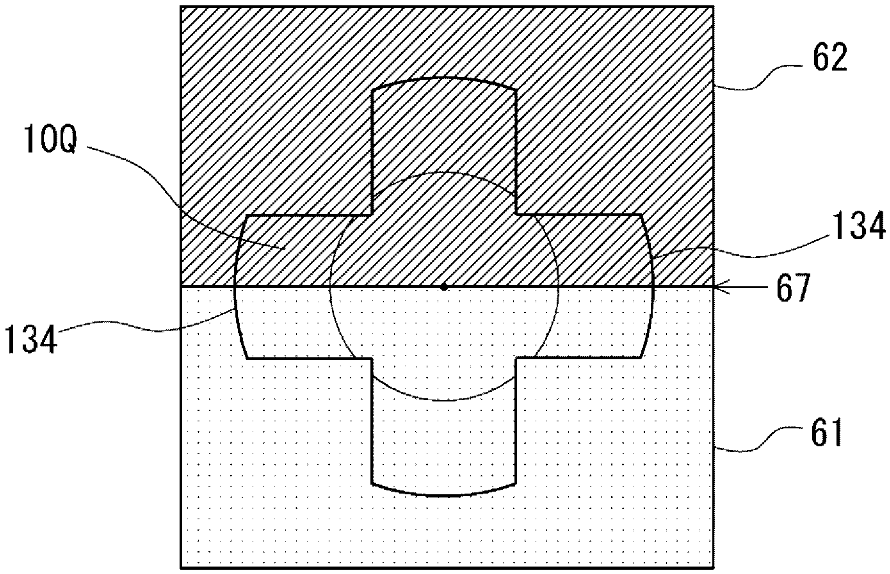
FIG. 7 is a diagram showing, as a comparative example, an example in which a mold is configured such that a joint between a core and a slide core can be formed on an outer peripheral surface of a first positioning pin that does not have a chamfered portion.
Figure 8:
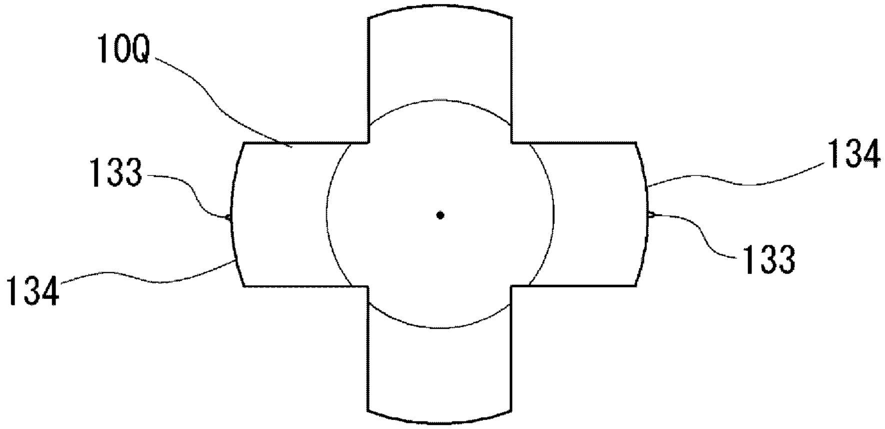
FIG. 8 is a diagram showing an example of a parting line formed by the mold of FIG. 7.

FIG. 7 is a diagram showing, as a comparative example, an example in which a mold is configured such that a joint 67 between the core 62 and the slide core 63 is formed on the outer peripheral surface 134 of a first positioning pin 10Q that does not have the chamfered portion 132. FIG. 8 is a diagram showing an example of the parting line 133 formed by the mold of FIG. 7. When the joint between the core 62 and the slide core 63 is formed on the outer peripheral surface 134 of the first positioning pin 10Q as in the comparative example, the parting line (burr) 133 is formed to protrude from the outer peripheral surface 134 as shown in FIG. 8. Therefore, when the first positioning pin 10Q according to the comparative example is inserted into the fitting hole of the display unit 50, the parting line (burr) 133 comes into contact with the inner wall of the fitting hole and obstructs the contact of the outer peripheral surface 134, which may reduce the accuracy of positioning. Specifically, it is necessary to increase an inner diameter of the fitting hole (to increase a clearance between the positioning pin and the fitting hole) so that the burr does not come into contact with the fitting hole, and the accuracy of positioning is decreased.

Figure 9:
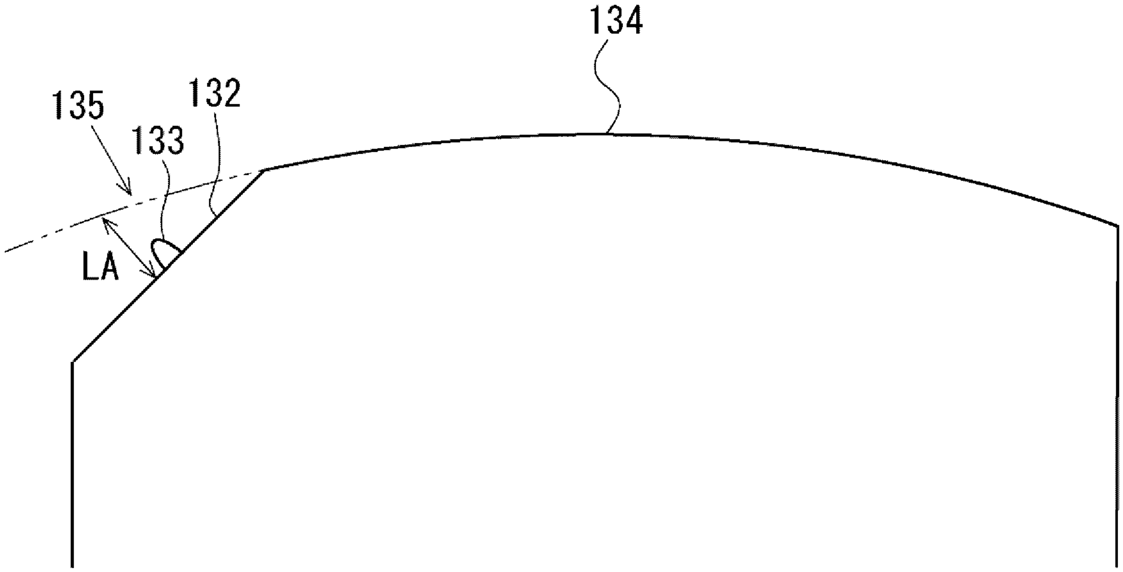
FIG. 9 is a diagram showing a configuration in the vicinity of the chamfered portion.

FIG. 9 is a diagram showing a configuration in the vicinity of the chamfered portion 132. As shown in FIG. 9, the first positioning pin 10 according to the present embodiment is formed such that a corner portion 135 of the outer peripheral surface 134 is chamfered, and an outer surface of the chamfered portion 132 is positioned closer to the central axis than the outer peripheral surface 134 by a predetermined distance LA. The predetermined distance LA is set to be larger than a protrusion amount of the parting line 133 formed at the time of injection molding. As described above, in the bracket (resin molded product) 30 according to the present embodiment, the parting line 133 of the first positioning pin 10 is formed in the chamfered portion 132, and the parting line 133 does not protrude outward from the outer peripheral surface 134. Therefore, in the bracket 30, when the first positioning pin 10 is inserted into the fitting hole of the display unit 50, it is possible to prevent the parting line 133 from coming into contact with the inner wall of the fitting hole and to prevent a reduction in positioning accuracy.

Further, when the first positioning pin 10 according to the present embodiment is viewed from the first direction, the reinforcing rib 13 extends in a cross direction from the central axis 1X, and the outer periphery thereof forms an arc. Accordingly, in the bracket 30 according to the present embodiment, a volume of the first positioning pin 10 is reduced as compared with a positioning pin having a cylindrical shape with the same outer diameter, so that the material may be reduced and sink marks may be suppressed.

Further, in the first positioning pin 10 according to the present embodiment, when viewed in the first direction, of the four reinforcing ribs 13K, 13L, 13M, and 13N extending along the cross direction from the central axis 1X, two corners formed by the outer peripheral surfaces of the two adjacent reinforcing ribs 13K and 13L are chamfered in a planar shape to form the chamfered portions 132. As described above, in the bracket 30 according to the present embodiment, the chamfered portions 132 are provided at the corner portions of the reinforcing ribs 13K and 13L, and the parting line 133 is formed in the chamfered portions 132 while sufficiently ensuring a contact surface with the fitting hole, thereby preventing a decrease in the positioning accuracy.

Further, the bracket 30 according to the present embodiment includes the second positioning pin 20 extending in the second direction from the first surface 31 or the second surface 32 different from the first surface 31, and the second direction of the second positioning pin 20 is different from the first direction of the first positioning pin 10. Further, in the bracket 30 according to the present embodiment, the first positioning pin 10 and the second positioning pin 20 are provided facing in opposite directions. The first positioning pin 10 is positioned with respect to a first device, and the second positioning pin 20 is positioned with respect to a second device. Further, for the bracket 30 according to the present embodiment, the first device may be the display unit 50, and the second device may be the main body portion 40 that controls the display unit. As described above, the bracket 30 according to the present embodiment may couple the display unit (first device) 50 and the main body portion (second device) 40, and may prevent the positioning accuracy with respect to the display unit 50 and the positioning accuracy with respect to the main body portion 40 from decreasing.

Second Embodiment

Figure 10:
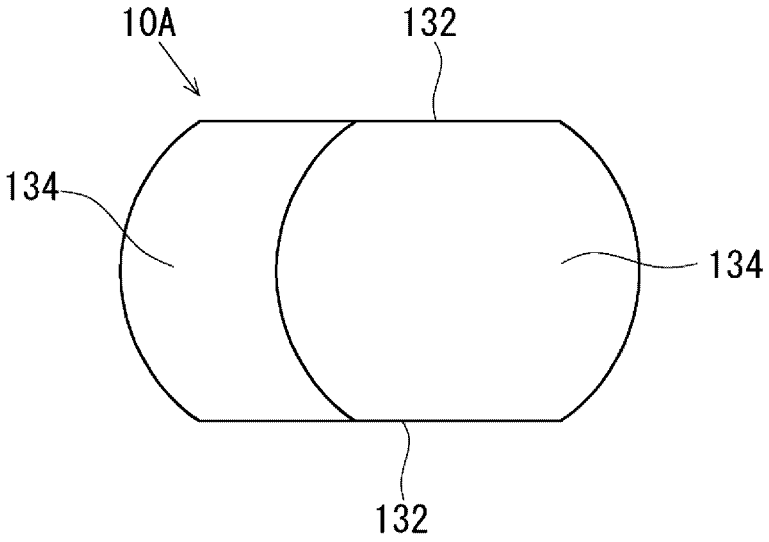
FIG. 10 is a front view showing a configuration of a first positioning pin according to a second embodiment.
Figure 11:
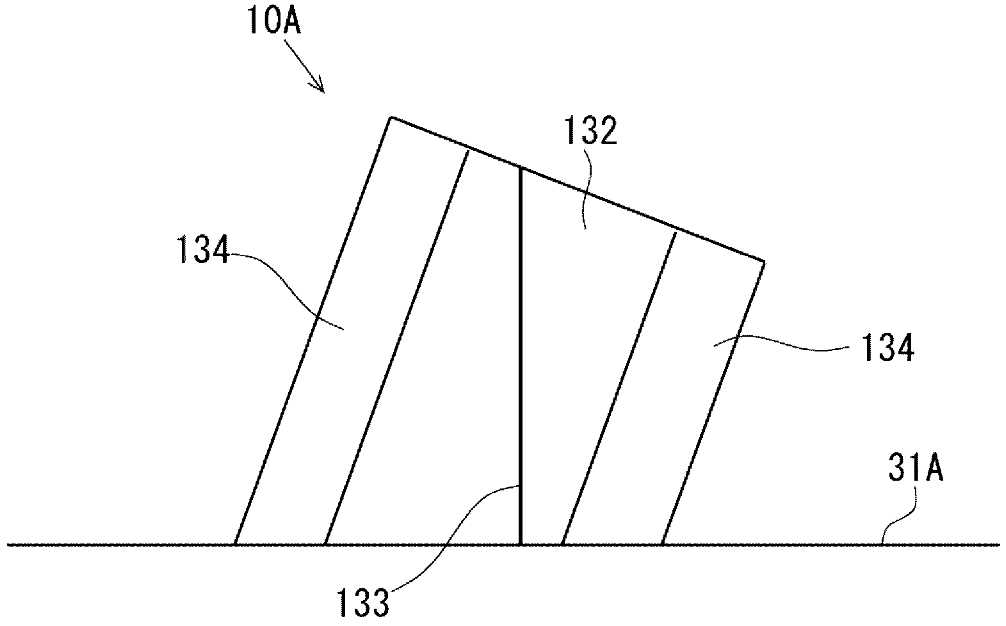
FIG. 11 is a side view showing the configuration of the first positioning pin according to the second embodiment.

FIG. 10 is a front view showing a configuration of a first positioning pin 10A according to the second embodiment. FIG. 11 is a side view showing the configuration of the first positioning pin 10A according to the second embodiment. The present embodiment is different from the first embodiment described above in that the first positioning pin 10A has a cylindrical shape. Since other configurations are the same as those of the first embodiment described above, the same elements are denoted by the same reference numerals, and the description thereof will not be repeated.

The first positioning pin 10A according to the present embodiment is a cylindrical member, and is provided in the first direction from the predetermined surface 31A toward the display unit 50. The first positioning pin 10A is provided in a direction different from the direction orthogonal to the first surface 31 of the bracket 30. That is, the first positioning pin 10A is formed to be inclined with respect to the removal direction of the core.

The first positioning pin 10A is provided with chamfered portions 132 chamfered in a planar shape at two positions facing each other on the outer peripheral surface 134, and a parting line 133 is formed in the chamfered portions 132.

As described above, in the bracket 30 according to the present embodiment, the parting line 133 is provided in the chamfered portions 132. Accordingly, when the first positioning pin 10A is inserted into the fitting hole of the display unit 50, it is possible to prevent the parting line 133 from coming into contact with the inner wall of the fitting hole and lowering the positioning accuracy.

Third Embodiment

Figure 12:
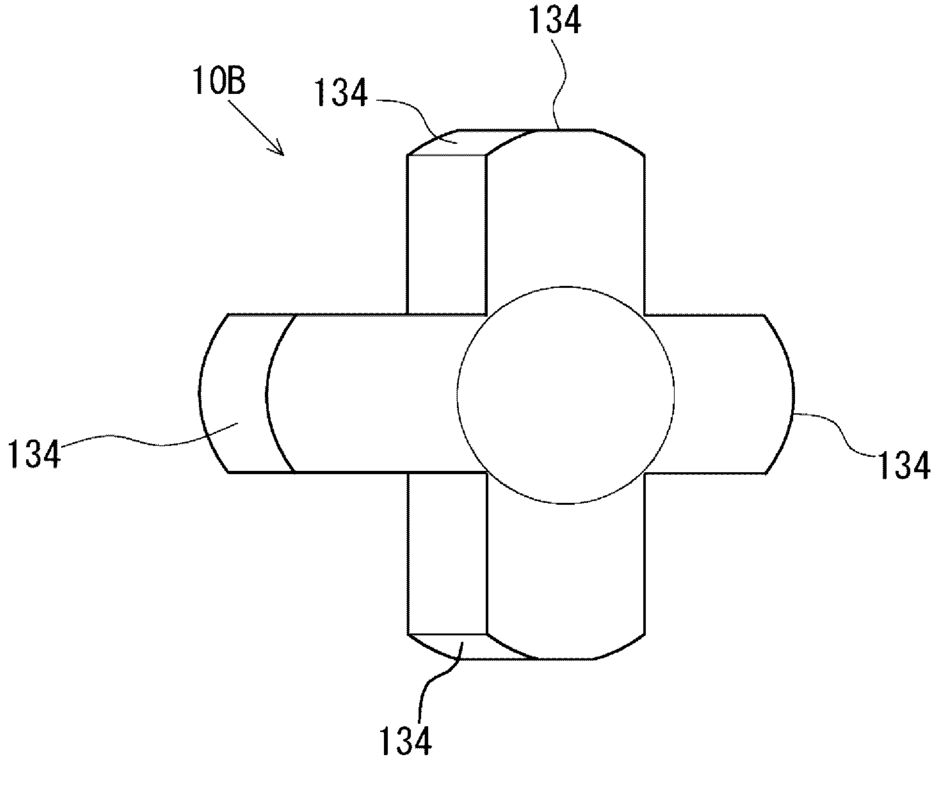
FIG. 12 is a front view showing a configuration of a first positioning pin according to a third embodiment.
Figure 13:
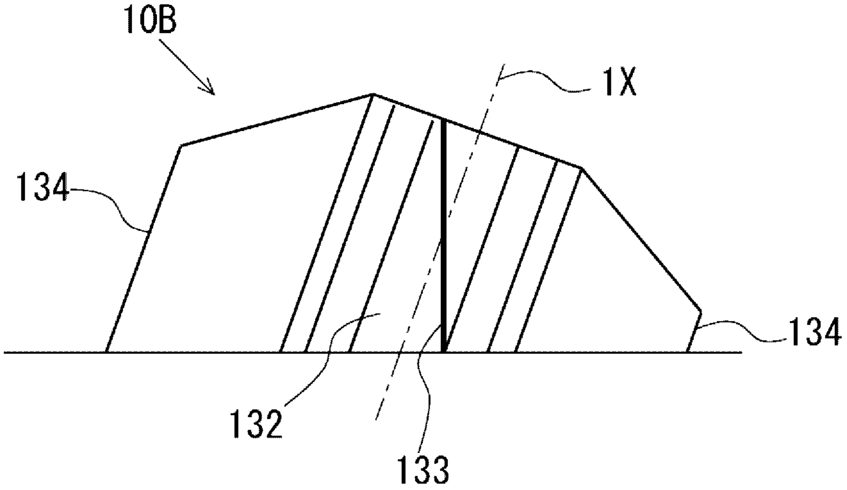
FIG. 13 is a side view showing the configuration of the first positioning pin according to the third embodiment.

FIG. 12 is a front view showing a configuration of a first positioning pin 10B according to a third embodiment. FIG. 13 is a side view showing the configuration of the first positioning pin 10B according to the third embodiment. The present embodiment is different from the first embodiment described above in that the chamfered portion 132 is formed on the outer peripheral surface 134 of the first positioning pin 10B, and other configurations are the same as those of the first embodiment. Therefore, the same elements are denoted by the same reference numerals, and the description thereof will not be repeated.

In the first positioning pin 10B according to the present embodiment, the chamfered portion 132 is provided by chamfering a central portion of the reinforcing rib 13 in a straight line rather than at a corner of the outer peripheral surface 134. The parting line 133 is formed on the chamfered portion 132 of the first positioning pin 10B.

Figure 14:
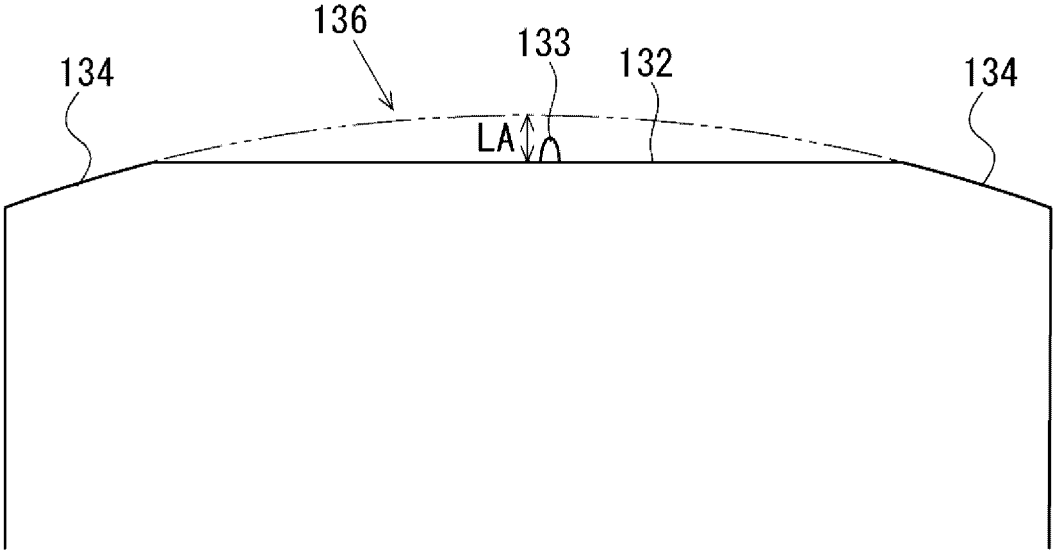
FIG. 14 is a view showing a configuration in the vicinity of a chamfered portion of a bracket according to the third embodiment.

FIG. 14 is a view showing a configuration in the vicinity of the chamfered portion 132 of the bracket 30 according to the third embodiment. As shown in FIG. 14, the first positioning pin 10B according to the present embodiment is formed such that a central portion 136 of the outer peripheral surface 134 is chamfered, and the outer surface of the chamfered portion 132 is positioned closer to the central axis than the outer peripheral surface 134 by the predetermined distance LA. That is, the outer peripheral surfaces 134 located on both sides of the chamfered portion 132 serve as contact surfaces to come into contact with the inner wall of the fitting hole. In the bracket 30 according to the present embodiment, the parting line 133 of the first positioning pin 10B is formed in the chamfered portion 132, and the parting line 133 does not protrude outward from the outer peripheral surface 134. Therefore, in the bracket 30, when the first positioning pin 10B is inserted into the fitting hole of the display unit 50, it is possible to prevent the parting line 133 from coming into contact with the inner wall of the fitting hole and lowering the positioning accuracy.

APPENDIX (1) A resin molded product including:
 a first surface; and
 a first positioning pin extending from the first surface in a first direction,
 in which the first positioning pin includes chamfered portions chamfered at two positions facing each other on an outer peripheral surface of the first positioning pin when viewed from the first direction, and a parting line is formed in the chamfered portions.

(2) The resin molded product according to (1),
 in which the first positioning pin includes reinforcing ribs each extending in a cross direction from a central axis to form the outer peripheral surface as an arc-shaped outer periphery when viewed from the first direction.

(3) The resin molded product according to (2),
 in which the chamfered portions are disposed on the arc-shaped outer periphery of the reinforcing ribs.

(4) The resin molded product according to (2),
 in which the chamfered portions are formed by chamfering a pair of corners of two adjacent reinforcing ribs that are in contact with the outer peripheral surface into a planar shape when viewed from the first direction.

(5) The resin molded product according to any one of (1) to (4), further including:
 a second positioning pin extending in a second direction from a second surface different from the first surface,
 in which the first direction and the second direction are different from each other.

(6) The resin molded product according to (5),
 in which the second positioning pin extends from the second surface positioned on a back side of the first surface,
 in which the first positioning pin is positioned with respect to a first device, and
 in which the second positioning pin is positioned with respect to a second device.

(7) The resin molded product according to (6),
 in which the first device is a display panel, and the second device is a main body portion that controls the display panel.

The foregoing description of the exemplary embodiments of the present invention has been provided for the purposes of illustration and description. It is not intended to be exhaustive or to limit the invention to the precise forms disclosed. Various modifications may be made without departing from the spirit or scope of the general inventive concept defined by the appended claims and equivalents thereof.

What is claimed is:

1. A resin molded product comprising:
a first surface; and
a first positioning pin extending from the first surface in a first direction, wherein
the first positioning pin includes an outer peripheral surface,
the outer peripheral surface includes chamfered portions at two positions facing away from each other on the outer peripheral surface when the first positioning pin is viewed from the first direction,
at least some portions of the outer peripheral surface where the chamfered portions are not located being configured to come into contact with an inner peripheral surface of a fitting hole of a component to which the resin molded product is assembled when the first positioning pin is inserted into the fitting hole, the chamfered portions being configured to not come into contact with the inner peripheral surface of the fitting hole of the component when the first positioning pin is inserted into the fitting hole, and a parting line is formed on the chamfered portions, the parting line protruding from a surface of the chamfered portions and being configured to not come into contact with the inner peripheral surface of the fitting hole of the component when the first positioning pin is inserted into the fitting hole.

2. The resin molded product according to claim 1, wherein the first positioning pin includes reinforcing ribs each extending in a cross direction from a central axis of the first positioning pin to form the outer peripheral surface as an arc-shaped outer periphery when viewed from the first direction.

3. The resin molded product according to claim 2, wherein the chamfered portions are disposed on the arc-shaped outer periphery of two of the reinforcing ribs.

4. The resin molded product according to claim 2, wherein the chamfered portions are formed by chamfering a pair of corners of two adjacent reinforcing ribs that are in contact with the outer peripheral surface into a planar shape when viewed from the first direction.

5. The resin molded product according to claim 1, further comprising:

a second positioning pin extending in a second direction from a second surface different from the first surface, wherein the first direction and the second direction are different from each other.

6. The resin molded product according to claim 2, further comprising:

a second positioning pin extending in a second direction from a second surface different from the first surface, wherein the first direction and the second direction are different from each other.

7. The resin molded product according to claim 3, further comprising:

a second positioning pin extending in a second direction from a second surface different from the first surface, wherein the first direction and the second direction are different from each other.

8. The resin molded product according to claim 4, further comprising:

a second positioning pin extending in a second direction from a second surface different from the first surface, wherein the first direction and the second direction are different from each other.

9. The resin molded product according to claim 5, wherein the second positioning pin extends from the second surface positioned on a back side of the first surface, wherein the first positioning pin is positioned with respect to a first device, and wherein the second positioning pin is positioned with respect to a second device.

10. The resin molded product according to claim 6, wherein the second positioning pin extends from the second surface positioned on a back side of the first surface, wherein the first positioning pin is positioned with respect to a first device, and wherein the second positioning pin is positioned with respect to a second device.

11. The resin molded product according to claim 7, wherein the second positioning pin extends from the second surface positioned on a back side of the first surface, wherein the first positioning pin is positioned with respect to a first device, and wherein the second positioning pin is positioned with respect to a second device.

12. The resin molded product according to claim 8, wherein the second positioning pin extends from the second surface positioned on a back side of the first surface, wherein the first positioning pin is positioned with respect to a first device, and wherein the second positioning pin is positioned with respect to a second device.

13. The resin molded product according to claim 9, wherein the first device is a display panel, and the second device is a main body portion that controls the display panel.

14. The resin molded product according to claim 10, wherein the first device is a display panel, and the second device is a main body portion that controls the display panel.

15. The resin molded product according to claim 11, wherein the first device is a display panel, and the second device is a main body portion that controls the display panel.

16. The resin molded product according to claim 12, wherein the first device is a display panel, and the second device is a main body portion that controls the display panel.

17. An in-vehicle information device comprising:

a display panel;

a main body portion; and a bracket coupling the display panel and the main body portion to each other, wherein the bracket is the resin molded product according to claim 1 including the first surface and the first positioning pin extending from the first surface in the first direction.

18. The resin molded product according to claim 1, wherein the first direction in which the first positioning pin extends from the first surface is different from a direction that is orthogonal to the first surface.

19. The resin molded product according to claim 1, wherein a distance between a central axis of the first positioning pin and a surface of the chamfered portions is less than a distance between the central axis of the first positioning pin and the at least some portions of the outer peripheral surface that are configured to come into contact with the inner peripheral surface of the fitting hole of the component.

20. The resin molded product according to claim 19, wherein a distance between the central axis of the first positioning pin and a radially outermost end of the parting line protruding from the chamfered portions is less than the distance between the central axis of the first positioning pin and the at least some portions of the outer peripheral surface that are configured to come into contact with the inner peripheral surface of the fitting hole of the component.

* * * * *